Oct. 29, 1957
F. L. SPENCER, JR
2,811,683
SERVO SYSTEM
Filed March 2, 1955
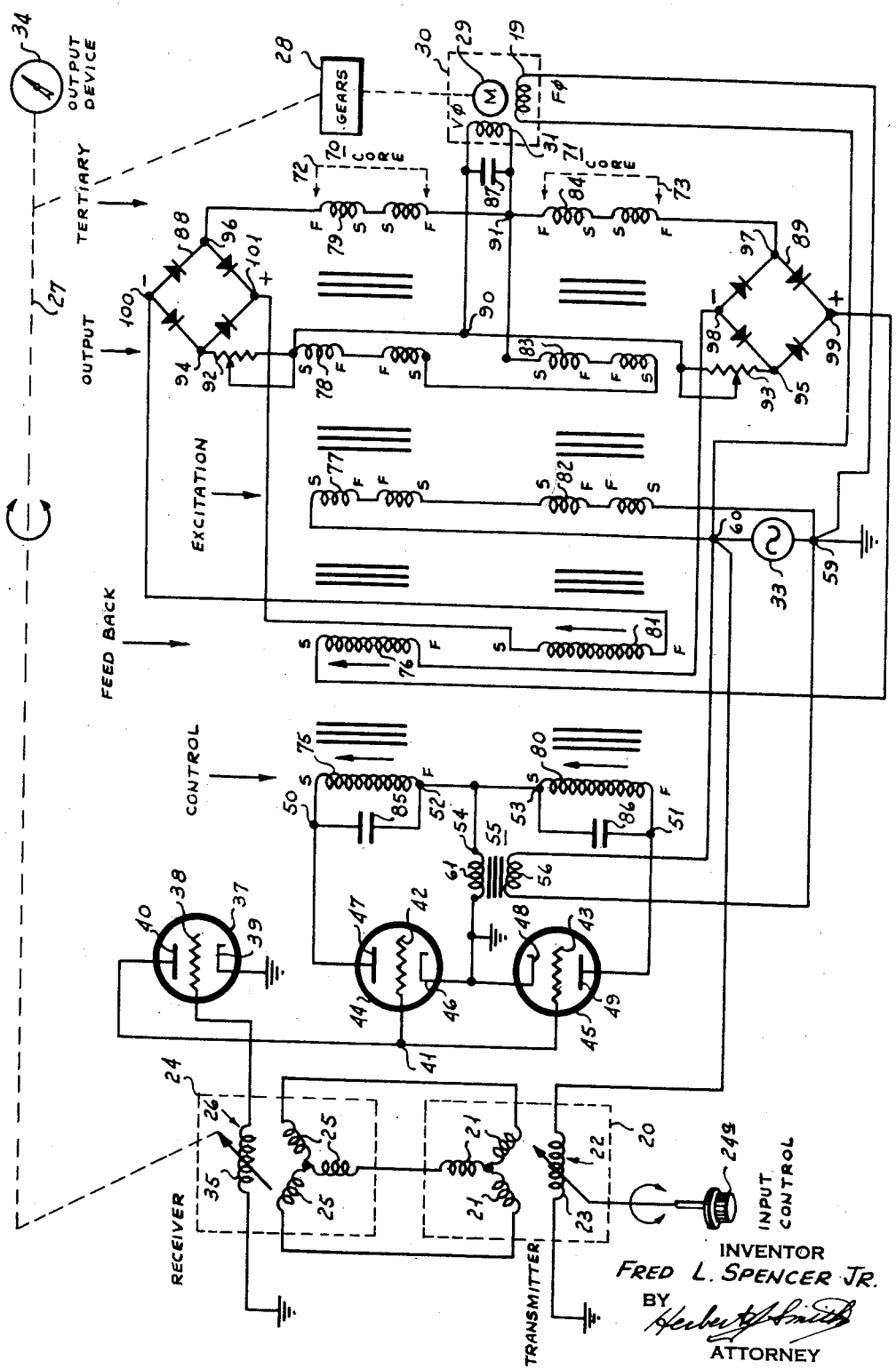
INVENTOR
FRED L. SPENCER JR.
BY
*Herbert J. Smith*
ATTORNEY

United States Patent Office 2,811,683
Patented Oct. 29, 1957

2,811,683

SERVO SYSTEM

Fred L. Spencer, Jr., Westwood, N. J., assignor to Bendix Aviation Corporation, Teterboro, N. J., a corporation of Delaware Application March 2, 1955, Serial No. 491,571

10 Claims. (Cl. 318—30)

This invention pertains to a servo system, and more particularly to a servo system employing a magnetic amplifier.

It is an object of the present invention to provide a novel amplifier employing saturable reactor elements having windings thereon to provide feedback in the magnetic amplifier circuit.

It is another object of the invention to provide a novel amplifier employing saturable reactor elements having windings thereon to provide feedback in the magnetic amplifier circuit for increasing the output of the amplifier.

A further object of the invention is to provide a novel magnetic amplifier utilizing a pair of magnetic amplifier elements having windings thereon for providing positive feedback for increasing amplification of the signal.

Another object is to provide a novel magnetic amplifier utilizing a pair of magnetic amplifier elements having windings thereon for providing negative feedback for increasing linearity of amplification.

Another object of the invention is to provide a novel position servo system employing a transformer type magnetic amplifier using a pair of magnetic amplifier elements, each having a tertiary winding coupled to an output winding via bridge-type rectifiers to provide differential energization of feedback windings on the saturable reactor elements to increase the effectiveness of the control windings when energized by an alternating current input signal of predetermined frequency and phase.

The present invention contemplates a servo system employing a magnetic amplifier of the transformer type utilizing two magnetic amplifier elements, each having a tertiary winding and a feedback winding, in addition to the control, excitation, and output windings. The tertiary windings are connected to the output windings in a bridge arrangement for providing a pair of alternating current inputs for a complementary pair of bridge-type rectifiers for differentially energizing the feedback windings The foregoing and other objects and advantages of the invention will appear more fully hereinafter from a consideration of the detailed description which follows, taken together wtih the accompanying drawing, wherein an embodiment of the invention is illustrated by way of example. It is to be expressly understood, however, that the drawing is for illustration purposes only and not to be construed as defining the limits of the invention.

Referring to the drawing, there is shown a schematic diagram of a position servo having a transmitter inductive device 20 having stator windings 21 and a rotor 22 with windings 23, with said rotor being coupled to any suitable input control 24a, represented as a knob, for angularly positioning the transmitter rotor 22 relative to the stator windings 21. A receiver inductive device 24 has its stator windings 25 connected to the stator windings 21 of the transmitter in a conventional manner. The rotor 26 of the receiver inductive device has its shaft 27 coupled through a gear train 28 to the armature 29 of a reversible motor 30 having variable phase windings 31 connected to the output of the magnetic amplifier 32, and fixed phase winding 19 excited by a source of alternating current, or alternator 33.

The shaft 27 which couples the motor to the receiver rotor also actuates an output device 34, as the motor drives the receiver to null. The output device may be an indicator or other means for driving some device, for example, a computer. The rotor winding 35 of the receiver rotor 26 has one end connected to ground, as shown by conventional symbol, with the other end thereof connected via a resistor 36 to the grid of the pre-amplifier tube 37.

The winding 23 of transmitter rotor 22 has one end thereof connected to ground with the opposite end being connected to the alternator 33. The pre-amplifier tube 37 has a grid 38 connected to the output of the receiver rotor winding 35 via resistor 36, a cathode 39 connected to ground, and a plate 40 connected to a terminal 41 which feeds the grids 42 and 43 of the push-pull arranged triode tubes 44 and 45, respectively.

Tube 44 also has a cathode 46 and a plate 47, while tube 45 has a cathode 48 and a plate 49, said cathodes being connected together at a common terminal 50. The plates 47 and 49 are connected, respectively, to input terminals 50 and 51 of the magnetic amplifier 32. Terminals 52 and 53 are connected at terminal 54. A transformer 55 has a primary winding 56 with conductors 57 and 58 connected to the terminals 59 and 60, which latter terminals are the two terminals of the alternator 33. The secondary 61 of the transformer 55 is connected to the terminals 50 and 54 to provide an alternating current across the cathodes and the plates of tubes 44 and 45, via the control windings of the magnetic amplifier, to provide direct current through one or the other of the control windings, depending on the phase of the input signal from the transmitter-receiver arrangement, said input signal being either in phase or 180° out of phase with the excitation on the plates of tubes 44 and 45, depending on the direction of angular displacement of the input control. Therefore, either tube 44 or tube 45 will conduct when the transmitter and receiver are not in positional agreement, or at null.

The magnetic amplifier of the invention is of the transformer type. The said type of said magnetic amplifier is distinguished by the presence of at least two electrically isolated but magnetically coupled excitation windings, one of which is excited by a source of alternating potential, while the other or output winding supplied output to a load.

In the present invention, the magnetic amplifier comprises two saturable reactor elements 70 and 71, each having a core and five windings thereon. Saturable reactor element 70 has a core 72, while saturable reactor element 71 has a core 73. Said cores 72 and 73, in each case, are represented by a bracket, with each core having the conventional symbol, representing core material, of three parallel lines between the respective windings of the two cores. In the present instance, the cores 72 and 73 are of the well known E–I type, but it is to be understood that toroidal cores may be used to produce the same result. Core 72 has wound thereon a control winding 75 and a feedback winding 76, both of said windings being on the center leg of the core. On the outer legs of the core there are excitation, output, and tertiary windings 77, 78 and 79, respectively, with each of said windings having two separate coils, one being disposed on each of the outside legs of the core. The term tertiary is used since the tertiary windings are the third windings on the outer legs of the cores. However, the tertiary windings may also be referred to as auxiliary windings. The excitation, output, and tertiary windings, are designated by reference numerals 77, 78, and 79, respectively. By conventional symbols, the letters S and F, are shown adjacent the ends of their respective coils to indicate the start and finish of the coils, so that arrangement of the coils will be such as to provide proper functioning of the respective elements. Relative to core 73, the control, feedback, excitation, output and tertiary windings are shown having reference numerals 80, 81, 82, 83, and 84, respectively. The windings on core 73 are identical with the windings on core 71.

Capacitors 85 and 86 are in shunt, respectively, with the control windings 75 and 80. A capacitor 87 is connected across the variable phase winding 31 to provide the 90° phase shift from the excitation impressed across the fixed phase winding 19 of the motor 30, required for operation of motor 30. The excitation windings 77 and 82 are serially connected across the alternator 33 via terminals 59 and 50.

A pair of bridge-type rectifiers 88 and 89 provide two separate sources of direct current from the output of the device coupled with the tertiary windings 79 and 84, so that the alternating current provide in the input of the rectifiers 88 and 89 is converted to direct current for driving the feedback windings 76 and 81. Output terminals 90 and 91 are connected to the variable phase winding 31 of the motor. Variable potentiometers 92 and 93 are coupled, respectively, between the windings 78 and 83 to one side of the input of the respective rectifiers. Variable potentiometer 92 is connected to the input of rectifier 88 via terminal 94; while the variable potentiometer 93 is connected to the rectifier 89 via terminal 95. One end of each of said windings 79 and 84 are connected at terminal 91, while the opposite ends of said windings are connected to terminals 96 and 97 of rectifiers 88 and 89, respectively. Terminals 98 and 99 are connected to the feedback winding 76, while terminals 100 and 101 are connected to the feedback winding 81 with the polarities of direct current being as indicated on the drawing to provide the current flow in the proper direction for positive feedback, as indicated by the arrows adjacent windings 76 and 81.

With either equal or zero direct current ampere turns in both of the control windings 75 and 80, the applied alternating excitation voltage divides equally between windings 77 and 82. Voltages controllable by the turns ratio are induced in the output windings 78 and 83. Since the output windings are connected in series opposition, as indicated, the output to the load across terminals 90 and 91 is a minimum with a low fundamental content.

When the current or ampere turns in one control winding is increased with respect to the other, the permeability of the core having the greater amount or excess direct current ampere turns decreases, the reaction of the excitation windings on that core decreases, and the voltage across that excitation winding decreases, while the voltage across the other excitation winding necessarily increases. The voltages are induced in the output windings proportionately, and the output voltage increases. The phase of the output voltage is determined by the degree of magnetization of the core which has the greater amount or excess of direct current amepere turns present as determined by the relative phase of the input signal.

The purpose of the feedback regulator resistors 92 and 93 is to adjust the feedback power to the desired value for proper operation of the device and to balance the output with no signal voltage at the input across control windings 75, 80. While variable potentiometers are shown for this purpose, it is to be understood that a series resistance may be connected in the direct current side of each of the feedback circuits, or a shunt impedance may be employed across either the alternating current or direct current rectifier terminals.

In operation, let us assume that core 72 has an excess of N–I (ampere turns) in its control winding 75. The permeability of core 72 decreases with respect to the permeability of core 73. The voltages across the alternating current windings 77, 78, and 79, of core 72, decreases; while the voltage across the alternating current windings 82, 83, and 84, of core 73, increases. Accordingly, the output voltage impressed across output terminals 90 and 91 increases from null to some higher value. Output windings 78, 83 and tertiary windings 79, 84 are connected so that the increase in voltage across tertiary winding 84 and the increased output voltage across output windings 78, 83 are additive across the rectifier 89 supplying the feedback energy to the feedback winding 76, and the decrease in voltage across tertiary winding 79, and the increased output voltage, are substractive across the rectifier 88 supplying the direct current energy to the feedback winding 81 with a resultant increased current in feedback winding 76 and decreased current in feedback winding 81. Since these changes add to the initial excess of D.-C. NI in core 72, the result is accumulative output increase. Since the feedback circuit operation depends upon addition and subtraction of voltages across the output and tertiary windings, the phase relationship existing between these voltages is important, as are the amplitude relationships.

If core 73 has an excess of N–I (ampere turns) the circuit action will be opposite to that just described. In either event, the feedback voltage is proportional to the output voltage and its magnitude is determined by the output voltage. The type of feedback presented by the present showing is essentially voltage, rather than current, and does not require a load to become operative, and will function to an open circuit.

By using negative feedback, which would be accomplished by interchanging the connections to the feedback windings 76 and 81, and retaining proper polarity, the linearity of the magnetic amplifier would be improved because the flux produced in the respective feedback winding would be in opposition to the flux produced by the complementary control winding, the amount of feedback being controllable by the potentiometers 92 and 93.

The arrows adjacent windings 75, 76, 80 and 81 indicate instantaeous polarities for the positive feedback condition.

While vacuum tubes are shown herein, any other amplifying devices, including transistors, may be employed. While the illustration in the drawing shows a three-wire push-pull input, any other conventional type of input may be used.

While one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a system having a low level input signal source, an amplifier for raising the level of said signal, and a controllable device actuable by the amplified signal, said amplifier having saturable reactor elements each with a control winding connected to said low level input signal source, an excitation winding energizable by a source of alternating voltage, an output winding for providing an amplified signal output, a tertiary and a feedback winding, and rectifier means connecting said output and tertiary windings to said feedback windings to provide feedback voltage determined by the output voltage for modifying said amplified signal output.

2. In a magnetic amplifier including a pair of saturable reactor elements having thereon control, excitation, and output windings to provide an amplified output from an input signal impressed across said control windings when said excitation windings are energized by a source of alternating voltage of predetermined frequency, said saturable reactor elements also having tertiary and feedback windings thereon, and rectifier means, said output windings and tertiary windings being connected to the input terminals of said rectifier means with said feedback windings being connected to output terminals of said rectifying means, whereby upon energization of said control and tertiary windings said feedback windings are energized by a voltage determined by the output voltage to modify the output.

3. A magnetic amplifier comprising two saturable reactor elements each with a core and having thereon control, feedback, excitation, output, and tertiary windings, said excitation, control and output windings being operatively connected to provide an output, and rectifier means operatively connected intermediate said output and tertiary windings and said feedback windings to provide differential feedback voltage determined by the output voltage.

4. An amplifier as set forth in claim 3 wherein said feedback windings are operatively connected to said output and tertiary windings via said rectifier means to improve the linearity of the amplifier output.

5. An amplifier in accordance with claim 3, wherein the rectifier means is a pair of bridge-type rectifier means each having a direct current output connected to one of said feedback windings.

6. An amplifier in accordance with claim 4 wherein said rectifier means is a pair of bridge-type rectifiers each having an output thereof connected to one of said feedback windings to provide positive feedback voltage to increase the gain of the amplifier.

7. In a system having a signal source, a magnetic amplifier responsive to said signal source for developing an output, and a means for utilizing said output, said magnetic amplifier including a pair of magnetic amplifier elements each having a core of magnetizable material with control, feedback, excitation, output, and tertiary windings thereon, said control windings being connected to said signal source, said output windings being connected to said means for utilizing the output of said amplifier, a source of alternating current of predetermined frequency connected to said excitation windings for periodic magnetization of said cores, a pair of bridge rectifiers, and a circuit arrangement connecting input of said bridge rectifiers and with the feedback windings on one core being connected to the output of the bridge rectifier connected to the winding on the other core, in each instance, to obtain a feedback voltage for both feedback windings determined by the output voltage.

8. In a system having a signal source, a magnetic amplifier responsive to said signal source for developing an output, and a means for utilizing said output, said magnetic amplifier including a pair of magnetic amplifier elements each having a core of magnetizable material with control, feedback, excitation, output, and tertiary windings thereon, said control windings being connected to said signal source, said output windings being connected to said means for utilizing the output of said amplifier, a source of alternating current of predetermined frequency connected to said excitation windings for periodic magnetization of said cores, a pair of bridge rectifiers, and a circuit arrangement of said output and tertiary windings with said bridge rectifiers and the feedback windings, whereby the feedback windings have impressed thereon voltages determined by the output voltage.

9. A magnetic amplifier having at least one core element of magnetizable material with a control winding having terminals for connection with a signal source, an output winding having terminals for connection with a utilization circuit, and an excitation winding having terminals for connection with a source of alternating current voltage, a feedback circuit arrangement including feedback and tertiary windings on said core, and rectifier means connecting said output and tertiary windings with said feedback winding to provide a feedback voltage proportional to the output voltage when said excitation winding is energized.

10. A magnetic amplifier having two cores of magnetizable material each having a control winding for connection to a signal source, an output winding for connection to a utilization circuit, and an excitation winding for connection to a source of alternating current voltage, a feedback winding and a tertiary winding, and rectifier means connecting the tertiary winding on one core and the output windings with the feedback winding on the other core to provide a feedback voltage proportional to the output voltage when the excitation winding is energized.

References Cited in the file of this patent
UNITED STATES PATENTS

| | | |
|---|---|---|
| 1,995,530 | Askey | Mar. 26, 1935 |
| 2,559,513 | Palmer | July 3, 1951 |
| 2,580,512 | Broadbent et al. | Jan. 1, 1952 |